(12) United States Patent
Oikawa (10) Patent No.: US 6,985,930 B2
(45) Date of Patent: Jan. 10, 2006

(54) INFORMATION READING APPARATUS AND INFORMATION READING METHOD

(75) Inventor: Tomoya Oikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 664 days.

(21) Appl. No.: 09/927,615

(22) Filed: Aug. 10, 2001

(65) Prior Publication Data

US 2002/0030697 A1    Mar. 14, 2002

(30) Foreign Application Priority Data

Aug. 11, 2000  (JP)  ............... 2000-244698

(51) Int. Cl.
  *G06F 15/16*  (2006.01)
  *G06F 15/00*  (2006.01)
(52) U.S. Cl. .................... 709/217; 715/501.1
(58) Field of Classification Search ........... 709/203, 709/217–219, 245; 715/501.1; 707/3, 5, 707/10

See application file for complete search history.

(56) References Cited

U.S. PATENT DOCUMENTS

| | | | | |
|---|---|---|---|---|
| 6,034,689 A | * | 3/2000 | White et al. | ............ 715/854 |
| 6,133,913 A | * | 10/2000 | White et al. | ............ 715/719 |
| 6,381,637 B1 | * | 4/2002 | Kamada | ............ 709/218 |
| 6,456,305 B1 | * | 9/2002 | Qureshi et al. | ............ 715/800 |
| 6,674,439 B1 | * | 1/2004 | Shin et al. | ............ 345/501 |

FOREIGN PATENT DOCUMENTS

EP              945811 A1  *  9/1999

* cited by examiner

*Primary Examiner*—David Wiley
*Assistant Examiner*—Yemane M. Gerezgiher
(74) *Attorney, Agent, or Firm*—Frommer Lawrence & Haug LLP; William S. Frommer; Thomas F. Presson (57) ABSTRACT

A system and method for automatically displaying information from a designated information providing location and information from an associated information providing location. Information a designated information providing location is read from an automatic reading control section through a communication processing section. An information generation section discriminates an associated information providing location included in the read information, generates an automatic reading instruction list for designating a information providing location that reads the next information and stores the automatic reading instruction list in an information storage section. The automatic reading control section sequentially reads information from information providing locations according to the automatic reading instruction list. The information generation section discriminates the associated information providing location included in the read information and updates the automatic reading instruction list. The information read is supplied to and displayed on a display section.

15 Claims, 9 Drawing Sheets

| ADDRESS | INFORMATION PROVIDING LOCATION | LINK DATA |
|---|---|---|
| A1 | URL-a | A2, A3, A4 |
| A2 | URL-b | A5, A6 |
| A3 | URL-c | A7, A8 |
| A4 | URL-d | A9 |
| A5 | URL-e | A10, A11 |
| A6 | URL-f | A12, A13 |
| A7 | URL-g | |
| A8 | URL-h | |
| A9 | URL-j | A14 |
| A10 | URL-k | |
| A11 | URL-m | |
| A12 | URL-n | |
| A13 | URL-p | |
| A14 | URL-q | |

(HIERARCHICAL LINK INFORMATION)

FIG. 3A

| ADDRESS | INFORMATION PROVIDING LOCATION |
|---|---|
| B1 | URL-a |
| B2 | URL-b |
| B3 | URL-c |
| B4 | URL-d |
| B5 | URL-e |
| B6 | URL-f |
| B7 | URL-g |
| B8 | URL-h |
| B9 | URL-j |
| B10 | URL-k |
| B11 | URL-m |
| B12 | URL-n |
| B13 | URL-p |
| B14 | URL-q |

(AUTOMATIC READING INSTRUCTION LIST)

FIG. 3B

| ADDRESS | INFORMATION PROVIDING LOCATION | LINK DATA |
|---------|-------------------------------|-----------|
| A1 | URL-a | A2, A3, A4 |
| A2 | URL-b | A5, A6 |
| A3 | URL-c | A11, A12 |
| A4 | URL-d | A13 |
| A5 | URL-e | A7, A8 |
| A6 | URL-f | A9, A10 |
| A7 | URL-k | |
| A8 | URL-m | |
| A9 | URL-n | |
| A10 | URL-p | |
| A11 | URL-g | |
| A12 | URL-h | |
| A13 | URL-j | A14 |
| A14 | URL-q | |

(HIERARCHICAL LINK INFORMATION)

FIG. 4A

| ADDRESS | INFORMATION PROVIDING LOCATION |
|---------|-------------------------------|
| B1 | URL-a |
| B2 | URL-b |
| B3 | URL-e |
| B4 | URL-k |
| B5 | URL-m |
| B6 | URL-f |
| B7 | URL-n |
| B8 | URL-p |
| B9 | URL-c |
| B10 | URL-g |
| B11 | URL-h |
| B12 | URL-d |
| B13 | URL-j |
| B14 | URL-q |

(AUTOMATIC READING INSTRUCTION LIST)

INFORMATION READING APPARATUS AND INFORMATION READING METHOD

BACKGROUND OF THE INVENTION

1. Field of the Invention

The present invention relates to an information reading apparatus and an information reading method. More specifically, the present invention relates to an information reading apparatus and an information reading method for, when information is downloaded, discriminating an information providing location included in obtained information, generating an automatic reading instruction list for designating the next information providing location from which information is to be read, automatically and sequentially reading information from information providing locations in accordance with this automatic reading instruction list and, if an information providing location is included in this read information, registering this information providing location in the automatic reading instruction list to thereby automatically display information from the associated information providing locations.

2. Description of the Related Art

Recently, as a network, e.g., the Internet spreads, services for providing various types of information are carried out. To use information services through the Internet, a browser which is an information reading software is operated using a computer apparatus, information transmission is requested to an information providing location, and information supplied is displayed on the computer apparatus and stored in a hard disk device or the like.

Further, a television apparatus having a reading function or an internet connection device connected to a television apparatus and enabling the television apparatus to have a reading function are put into practice so that even those who cannot operate computer apparatuses are able to utilize information services through the Internet.

The television apparatus and the internet connection apparatus of these types enable users to use information services through the Internet only by operating a remote control apparatus. In addition, consideration is given to displaying information to be supplied and displaying operation menus so as to facilitate carrying out various instructions for using information services.

Meanwhile, according to a conventional television apparatus, if the television apparatus receives the signal of a program broadcast from a broadcast station, display on a screen is automatically updated without operation of remote control apparatus by a user. In case of the display of information supplied through the Internet, by contrast, the information for one image plane is displayed and the display state is held. Due to this, to sequentially change the display of information supplied through the Internet as in the case of a broadcast program, and to display information from an associated information providing location, a user is required to perform an image switching operation using the remote control apparatus while constantly viewing a screen. As a result, operation is quite complicated compared with a case of displaying a broadcast program.

SUMMARY OF THE INVENTION

It is an object of the present invention to provide an information reading apparatus and an information reading method capable of automatically, sequentially displaying information from an information providing location associated with information from a designated information providing location.

An information reading apparatus according to the present invention comprises: information reading means for reading information from an information providing location; information generation means for discriminating an associated information providing location included in the information read from the information providing location, and for generating and updating an automatic reading instruction list for designating a next information providing location from which information is read next; storage means for storing the automatic reading instruction list generated and updated by the information generation means; display means for displaying the information read by the information reading means; and control means for instructing information providing locations from which information is read by the information reading means in accordance with the automatic reading instruction list stored by the storage means.

Further, an information reading method according to the present invention is characterized by comprising the steps of: reading information from a designated information providing location; discriminating an associated information providing location included in the read information, and generating an automatic reading instruction list for designating a next information providing location from which information is to be read next; sequentially reading information from information providing locations in accordance with the automatic reading instruction list, discriminating associated information providing locations included in the read information, and updating the automatic reading instruction list; and sequentially displaying the information read from the designated information providing location and the information sequentially read from the information providing locations in accordance with the automatic reading instruction list.

According to the present invention, if an information providing location is designated and information is downloaded therefrom, an information providing location included in the obtained information, e.g., an URL showing information providing locations is discriminated, and an automatic reading instruction list is generated using this URL. In accordance with this automatic reading instruction list, information is sequentially, automatically read from information providing locations. If the information read includes the URL of a new information providing location, the automatic reading instruction list is updated using this URL and the automatic reading instruction list for prioritizing the information providing locations in the same hierarchy or sequentially searching the information providing locations in the deeper direction of the hierarchy is generated. In accordance with this automatic reading instruction list, information is sequentially read from the information providing locations and the read information is supplied to display means. The display means automatically displays information from an associated information providing location. Also, when the information is displayed, display time is set based on the quantity of information. If an information display size is larger than the screen size of the display means, the display part of the information displayed on the screen is switched to allow all the information to be displayed, and information from the next information providing location is displayed. Further, using the display period for which this information is displayed, information from the next information providing location is read in advance based on the automatic reading instruction list.

DETAILED DESCRIPTION OF THE PREFERRED EMBODIMENTS

Figure 1:
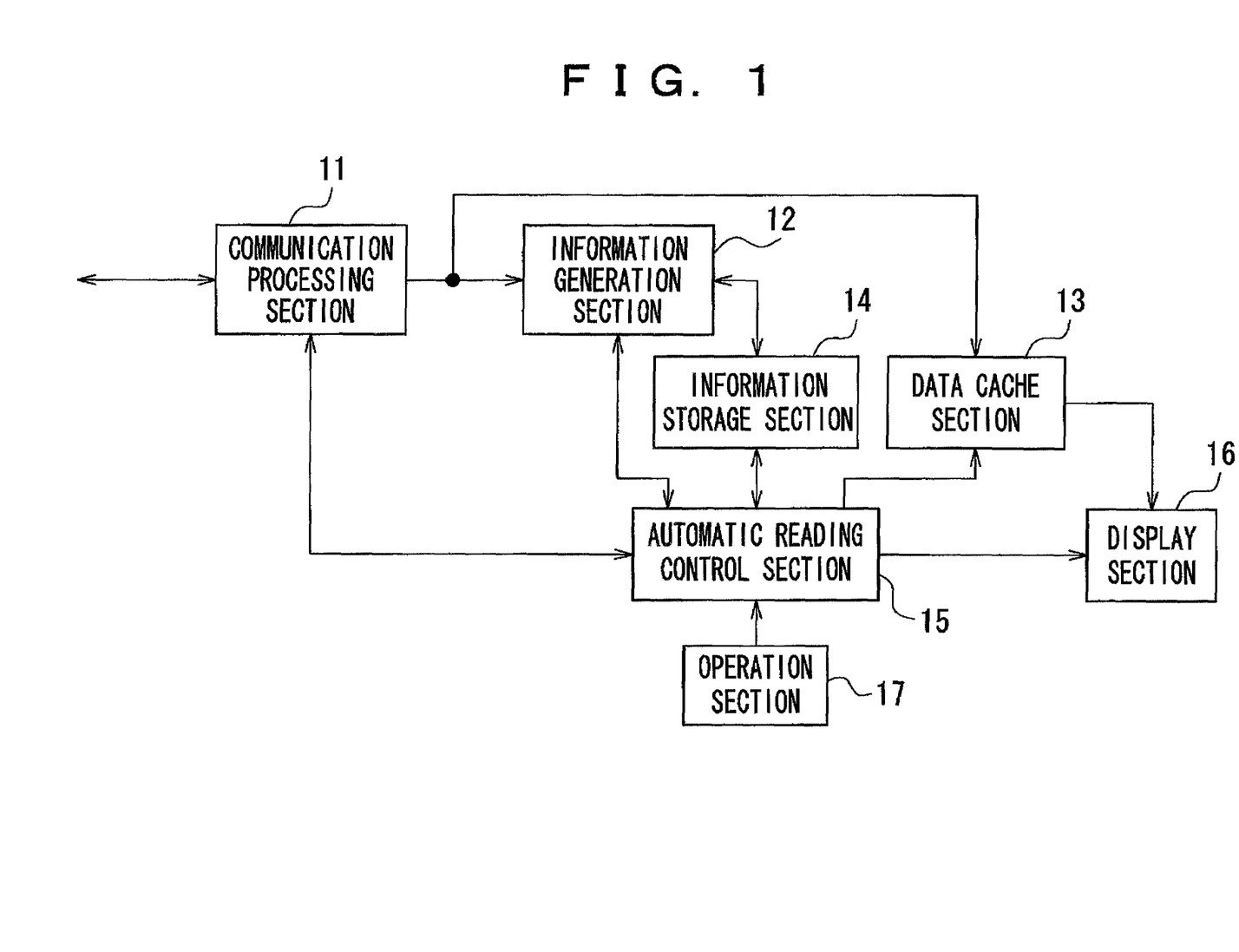
FIG. 1 is a block diagram showing the constitution of an information reading apparatus.

One embodiment of the present invention will be described hereinafter with reference to the drawings. FIG. 1 shows the constitution of an information reading apparatus. The communication processing section 11 of the information reading apparatus requests an information provider to provide information through a network, e.g., the Internet, receives information supplied from the information provider and supplies the received information to an information generation section 12 and a data cache section 13.

The information generation section 12 sequentially analyzes information supplied from the information provider, discriminates associated information providing locations, creates a hierarchy showing the correlation among the discriminated information providing locations and stores the hierarchical correlation in the information storage section 14 as hierarchical link information. If the information supplied from the information provider is information generated using, for example, HTML (Hyper Text Make-up Language), linked URLs (Uniform Resource Locators), for example, indicated by using tags are stored as information indicating the associated information providing locations in the information storage section 14. Also, when stored in the information storage section 14, the information providing locations are stored so that a hierarchical structure showing the correlation among the respective information providing locations can be discriminated.

Further, to read the associated information providing locations in an order according to a search mode designated by the automatic reading control section 15 to be described later, the information generation section 12 generates an automatic reading instruction list and stores the list in the information storage section 14. In addition, using a period in which the information is displayed on a display section 16 to be described later, the information generation section 12 requests the automatic viewing instruction section 15 to read information in advance, discriminates the associated information providing locations based on the information supplied from the information providing locations in response to the request and stores the information providing locations in the information storage section 14 as hierarchical link information. Further, using the associated information providing locations, the information generation section 12 updates the automatic reading instruction list. As can be seen, by information advance reading, it is possible to carry out a processing for discriminating the hierarchical structure of the associated information providing locations, to generate and update the automatic reading instruction list in advance, compared with a case of obtaining information from information providing locations, discriminating the associated information providing locations and the like.

The data cache section 13 holds information supplied from a communication processing section 11 for each information providing location. It is noted that the automatic reading control section 15 is notified from which of the information providing locations the information held in the data cache section 13 is supplied. The information held in the data cache section 13 is read in response to a request from the automatic reading control section 15 and supplied to the display section 16.

The information storage section 14 stores the hierarchical link information and the automatic reading instruction list supplied from the information generation section 12. The hierarchical link information is used when generating a new automatic reading instruction list. The automatic reading instruction list is read by the automatic reading control section 15 so as to set an information display order.

An operation section 17 consisting of operation keys and provided at a remote control signal receiver and the information reading apparatus is connected to the automatic reading control section 15. If a user operates the remote control apparatus and the operation keys and a signal indicating an information providing location is supplied from the operation section 17, then the communication control section 11 is controlled to request this information providing location to provide information. Also, if the information generation section 12 requests information to be read in advance, the communication control section 11 is controlled to request the information providing location instructed to read information in advance to provide information.

Further, the automatic reading control section 15 controls the operation of the information generation section 12 so as to read information in a search mode selected by the operation section. The automatic reading control section 15 also requests information providing locations to provide information in the order based on the automatic reading instruction list stored in the information storage section 14 and supplies the information supplied from the information providing locations to the display section 16, thereby automatically displaying the information in the selected search mode. If the information from the information providing locations are already stored in the data cache section 13, the automatic reading control section 15 reads the information from the data cache section 13 and supplies the read information to the display section 16 to thereby allow the display section to display the information. Moreover, the automatic reading control section 15 discriminates the quantity of information and the display size of the information to control the information display time of the display section 16 according to the quantity of information. If the display size is larger than the screen size of the display section 16, the automatic reading control section 15 carries out a processing for automatically moving the displayed image on the display section 1 to display all the information.

The operation section 17 can select one of two search modes, e.g., "width priority search mode" for prioritizing information providing locations in the same hierarchy and displaying information from these information providing locations, and "depth priority search mode" for sequentially searching information providing locations in the depth direction of the hierarchy and displaying information from these information providing locations.

Figure 2:
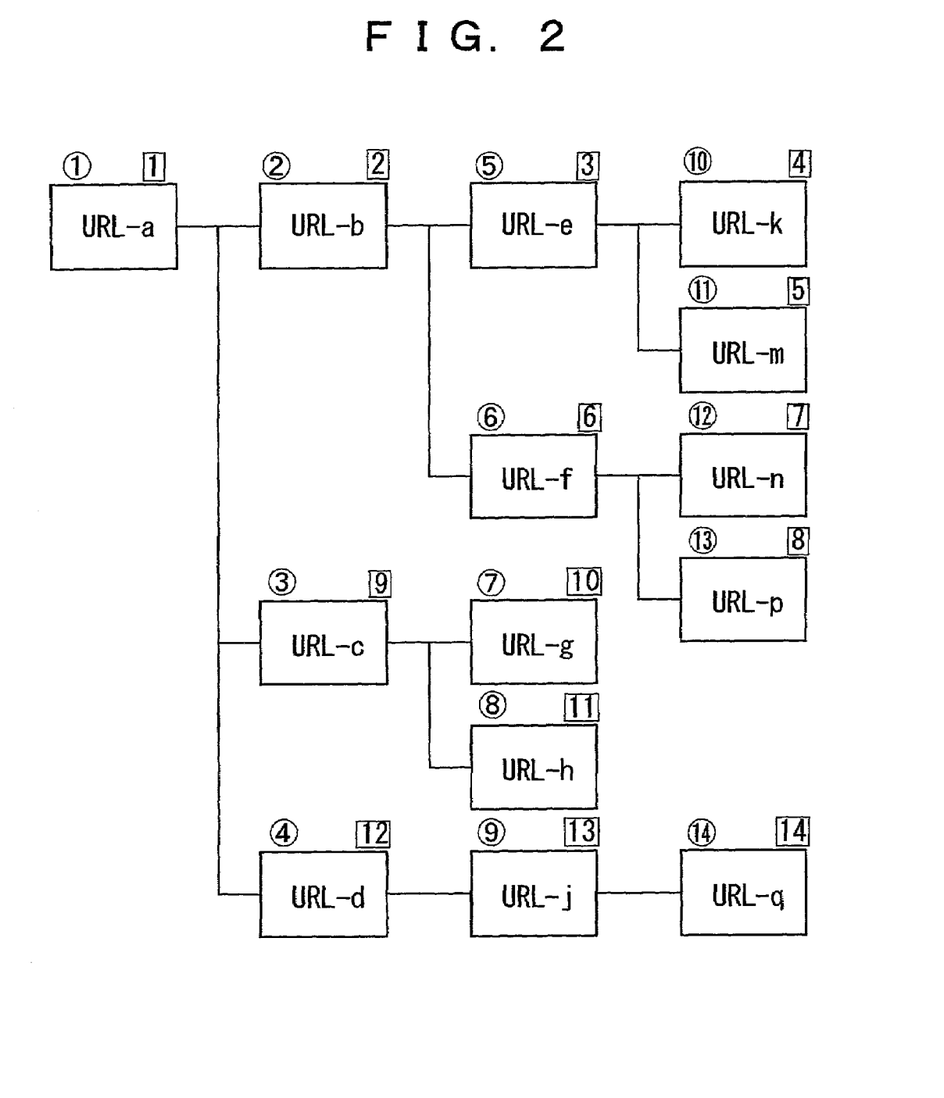
FIG. 2 shows the hierarchical structure of information providing locations.

If the information providing locations are associated with one another as shown in FIG. 2, the information providing locations are prioritized in the same hierarchy in "width priority search mode" and, therefore, information is displayed in the ascending order of numbers enclosed with circles. In the "depth priority search mode", information providing locations are sequentially searched in the depth direction of the hierarchy and information is displayed in the ascending order of numbers surrounded with squares.

Next, description will be given to one example of an operation for generating the hierarchical link information and the automatic reading instruction list stored in the information storage section 14 in both the "width priority search mode" and the "depth priority search mode".

Figure 3A:
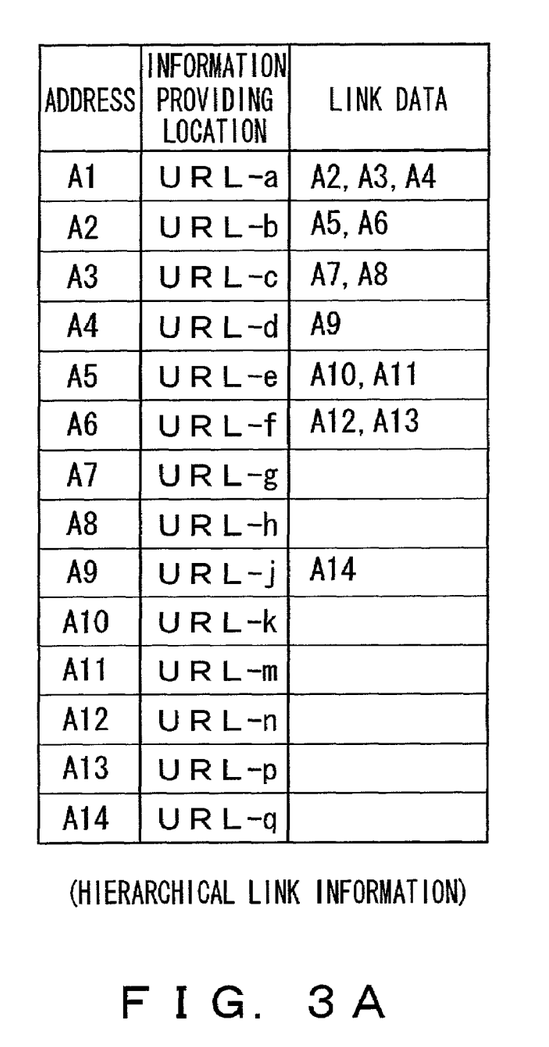
FIGS. 3A and 3B are explanatory views for a width priority search mode.

If the "width priority search mode" is selected, the first information providing location, e.g. "URL-a", the first URL (Uniform Resource Locator" is designated and information is read therefrom. Then, if the obtained information indicates the next information providing locations "URL-b, URL-c, and URL-d", "URL-a" is stored in an address "A" of the information storage section 14 and "URL-b, URL-c, and URL-d" are stored in addresses "A2 to A4" in this order, respectively. As shown in FIG. 3A, in addition, data "A2 to A4" indicating address positions at which "URL-b, URL-c and URL-d" are respectively stored is stored as link data so that the association of the information providing locations can be discriminated.

Next, "URL-b" in the address "A2" is designated and information is read therefrom in advance. If the obtained information indicates "URL-e and URL-f", this link information is added to the information storage section 14. Namely, "URL-e and URL-f" are stored in addresses "A5 and A6", respectively. In addition, data "A5, A6" indicating address positions at which "URL-e and URL-f" are respectively stored is stored in the address "A2" as link data.

Since information providing locations in the same hierarchy are prioritized in this mode, "URL-c" in the address "A3" is designated and information is read therefrom in advance. If the obtained information indicates "URL-g and URL-h", "URL-g and URL-h" are stored in addresses "A7 and A8", respectively and address position data "A7, A8" is stored in the address "A3" as link data. Further, "URL-d" in the address "A4" is designated and information is read therefrom in advance. If the obtained information indicates "URL-j", "URL-j" is stored in an address "A9" and address position data "A9" is stored in the address "A3" as link data.

Figure 3B:
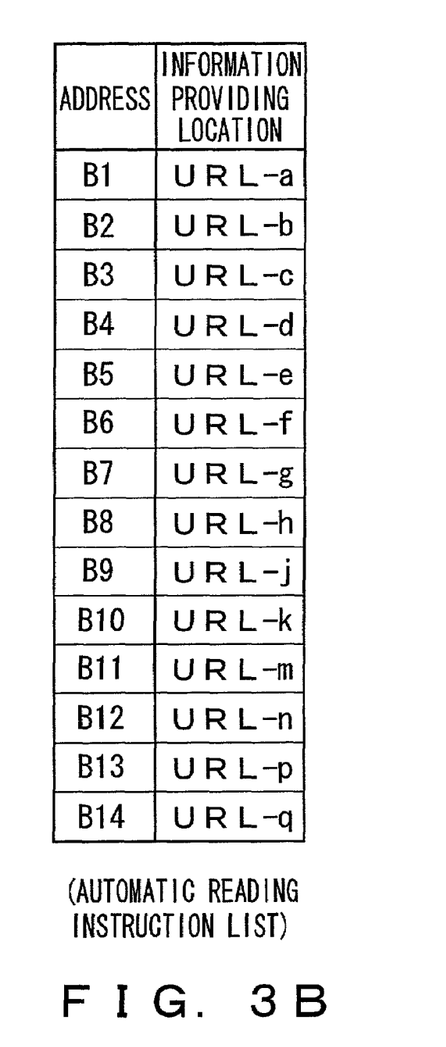

By reading information in advance in the same manner as that described above, hierarchical link information shown in FIG. 3A can be generated. In case of the hierarchical link information shown in FIG. 3A, information providing locations in the same hierarchy are put in blocks and arranged from upper to lower layers. Due to this, if the information providing locations are arranged in the same order as that of the hierarchical link information, it is possible to generate an automatic reading instruction list in the "width priority search mode" in which information providing locations in the same hierarchy are prioritized as shown in FIG. 3B. If the automatic reading control section 15 simply designates information providing locations according to the order shown in this automatic reading instruction list and makes an information request, information can be displayed in the "width priority search mode".

Figure 4A:
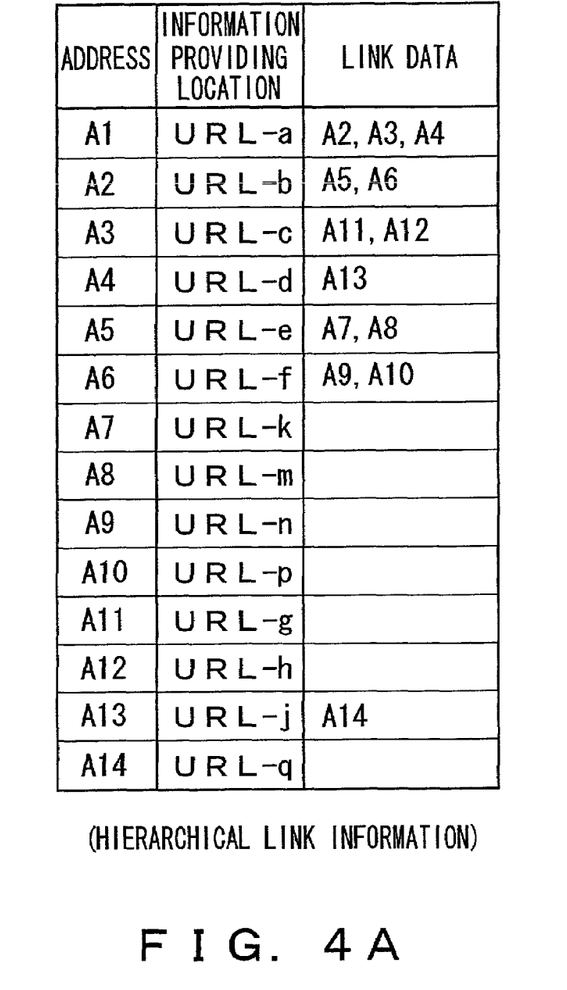
FIGS. 4A and 4B are explanatory views for a depth priority search mode.
Figure 4B:
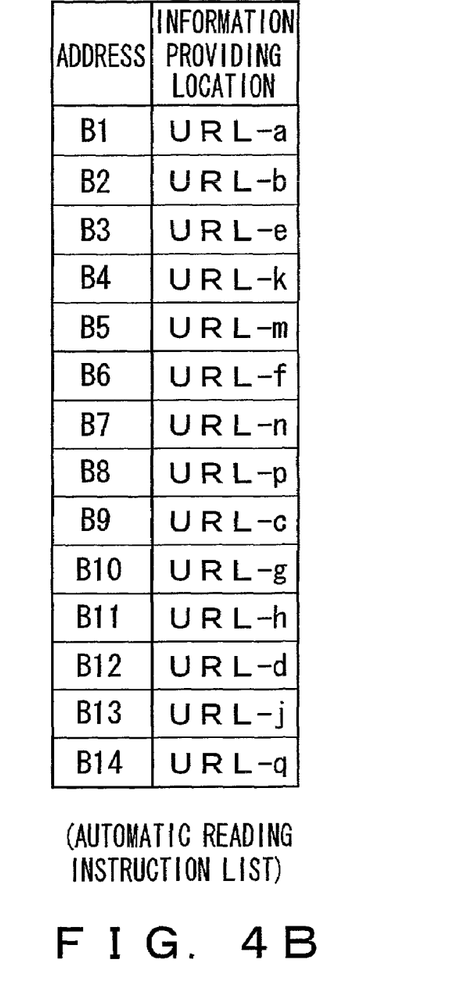

Next, if the "depth priority search mode" is selected, "URL-a" is designated first and information is read therefrom in advance. If the obtained information indicates "URL-b, URL-c and URL-d", "URL-a" is stored in the address "A1" and "URL-b, URL-c and URL-d" are stored in the addresses "A2 to A4", respectively as shown in FIG. 4A. In addition, data "A2 to A4" indicating address positions at which "URL-b, URL-c and URL-d" are respectively stored is stored in the address "A1" as link data so that the depth direction association can be discriminated.

Then, "URL-b" in the address "A2" is designated and information is read therefrom in advance. If the obtained information indicates "URL-e and URL-f", "URL-e and URL-f" are stored in the addresses "A5 and A6", respectively. In addition, data "A5, A6" indicating address positions at which "URL-e and URL-f" are respectively stored, are stored in the address "A2" as link data so that depth direction association can be discriminated.

If the discrimination of linked locations on the information of "URL-b" is completed, information providing locations are sequentially searched in the depth direction of the hierarchy. Thus, "URL-e" in the address "A5" is designated and information is read therefrom in advance. If the obtained information indicates "URL-k and URL-m", "URL-k and URL-m" are stored in addresses "A7 and A8", respectively. In addition, data "A7, A8" indicating address positions at which "URL-k and URL-m" are respectively stored, is stored in the address "A5" as link data.

Next, "URL-k" in the address "A7" associated with "URL-e" in the address "A5" is designated and information is read therefrom in advance. If the information obtained by this advance reading does not indicate any linked locations, then an information providing location from which information is not read is discriminated with reference to the information in the address "A5" one prior to "A7" in the hierarchy. Namely, data "A7, A8" is stored as link data on the address "A5" and information is already read from "URL-k" in the address "A7". Thus, "URL-m" in the address "A8" is designated and information is read therefrom in advance.

If the information obtained by this advance reading does not indicate any linked locations, an information providing location from which information is not read is discriminated with reference to the address "A5" one prior to "A8" in the hierarchy. In this case, information advance reading is completed for "URL-k and URL-m" in the addresses "A7 and A8" indicated by the link data on the address "A5". Due to this, information providing locations from which information is not read are discriminated with reference to the link data on the address "A2" one prior to the address "A5" in the hierarchy. Namely, since the link data on the address "A2" indicates the addresses "A5 and A6" and information advance reading is carried out for all the URLs associated with the address "A5", "URL-f" in the address "A6" is designated and information is read therefrom in advance. "URL-f" in the address "A6" is designated and information is read therefrom in advance. If the obtained information indicates "URL-n and URL-p", "URL-n and URL-p" are stored in addresses "A9 and A10", respectively. Also, data "A9, A10" indicating address positions at which "URL-n and URL-p" are respectively stored, is stored in the address "A6" as link data.

Next, "URL-n" in the address "A9" linked to "URL-f" in the address "A6" is designated and information is read therefrom in advance. If the information obtained by this advance reading does not indicate next linked locations, information providing locations from which information is not read are discriminated with reference to the link data in the address "A6" one prior to "A9" in the hierarchy. Namely, the link data on the address "A6" indicates the addresses "A9 and A10" and information has been read in advance from the URL in the address "A9". Due to this, "URL-p" in the address "A10" is designated and information is read therefrom in advance. If the information obtained by this advance reading does not indicate the next information providing locations, information providing locations from which information is not read are discriminated with reference to the information in the address "A6" one prior to "A10" in the hierarchy.

If information advance reading is completed for the addresses "A9 and A10" indicated by the link data on the address "A6", information providing locations from which information is not read are discriminated with reference to the link data on the address "A2" one prior to the address "A6" in the hierarchy. The link data on the address "A2" indicates the addresses "A5 and A6" and information advance reading is completed for all URLs associated with the addresses "A5 and A6". Therefore, referring to the link data on the address "A1" which is one prior to the address "A2" in the hierarchy, information providing locations from which information is not read are discriminated. Namely, the addresses "A2, A3 and A4" are indicated as the link data on the address "A1" and information advance reading has been completed for all the URLs associated with the address "A2". Therefore, "URL-c" in the address "A3" is designated and information is read therefrom in advance.

Information advance reading is continued in the same manner as that stated above, whereby hierarchical link information shown in FIG. 4A can be generated. Further, by arranging the information providing locations in the ascending order of information advance reading, an automatic reading instruction list in the "depth priority search mode" for sequentially searching information providing locations in the depth direction of the hierarchy. If the automatic reading control section 15 simply designates information providing locations in the order shown in this automatic reading instruction list and makes an information request, it is possible to display information in the "depth priority search mode".

Furthermore, in case of the hierarchical link information, the information providing locations are stored together with the link data for discriminating a hierarchical structure. Due to this, it is possible to generate an automatic reading instruction list in the "depth priority search mode" from the hierarchical link information generated in this "width priority mode" and to generate an automatic reading instruction list in the "width priority search mode" from the hierarchical link information generated in the "depth priority search mode".

In the above-stated case, the address positions at which the associated information providing locations are respectively stored are employed as link data. Alternatively, it is possible to employ the URLs of associated upper or lower information providing locations.

Figure 5:
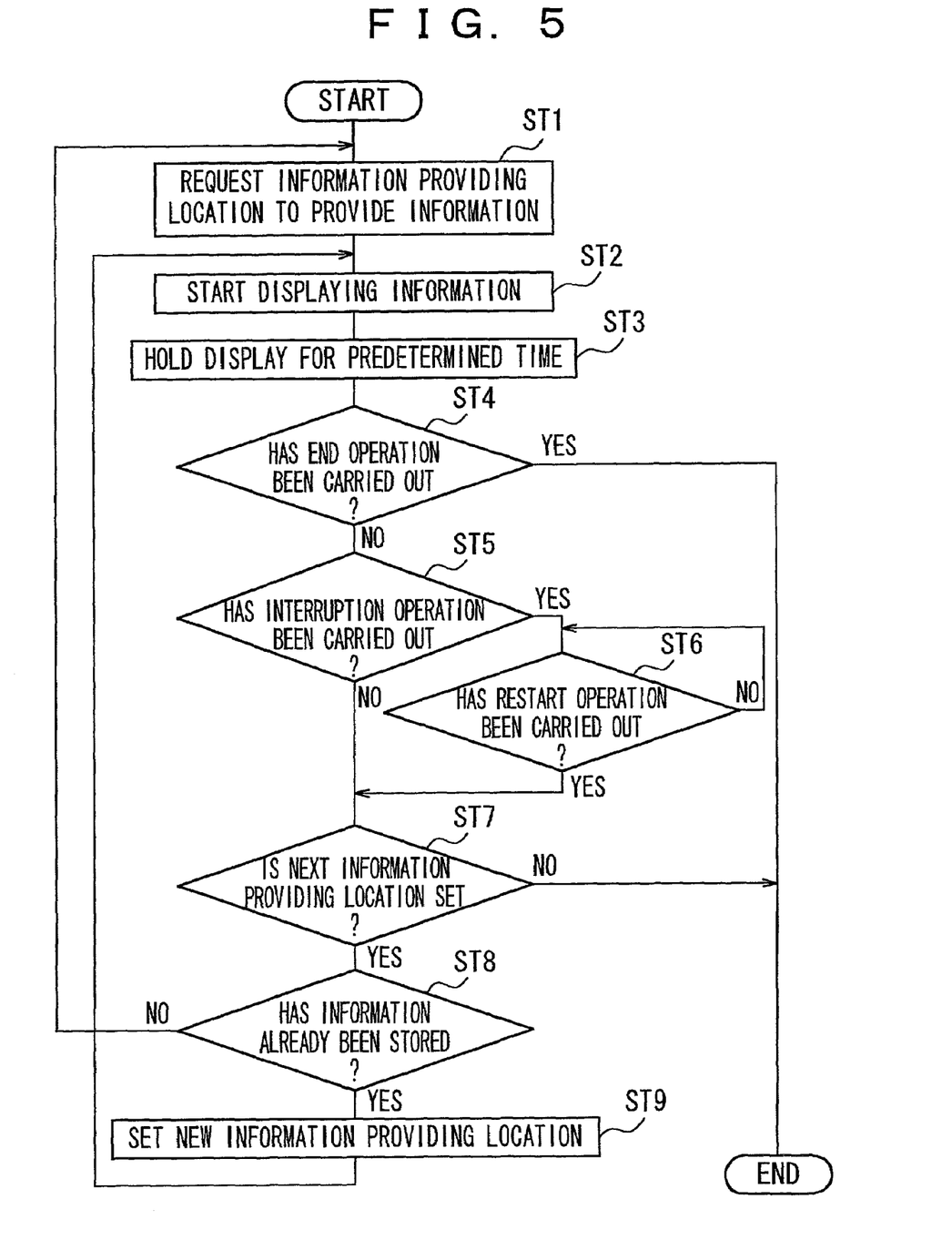
FIG. 5 is a flow chart showing an information display operation.

FIG. 5 is a flow chart showing an information display operation using the automatic reading instruction list generated as stated above. In a step ST1, when the operation section 17 designates the first information providing location, the designated information providing location is requested to provide information. It is noted that if information from the designated information providing location is already stored in the data cache section 13, information corresponding to the request is read from the cache section 13 and the operation goes to a step ST2.

In the step ST2, the information supplied through the communication processing section 11 from the information providing location or the information read from the data cache section 13 is supplied to the display section 16, the display section 16 starts displaying the information and the operation goes to a step ST3. In the step ST3, the display of the information is held for a predetermined time or for a time which is set based on the quantity of information so that the content of the information can be checked even if the quantity of information to be displayed is large, and the operation goes to a step ST4.

Meanwhile, in the automatic information reading operation, the display size of the information displayed by the display section 16 is not limited to a size equal to the screen size of the display section 16 but may sometimes be larger than the screen size of the display section 16. In the latter case, by moving the displayed image, all the information is controlled to be displayed on the screen of the display section 16.

Now, description will be given to a display operation if an information display size is 250 pixels (vertical)×100 pixels (horizontal) and the screen size of the display section 16 is 100 pixels×100 pixels.

Figures 6A, 6B:
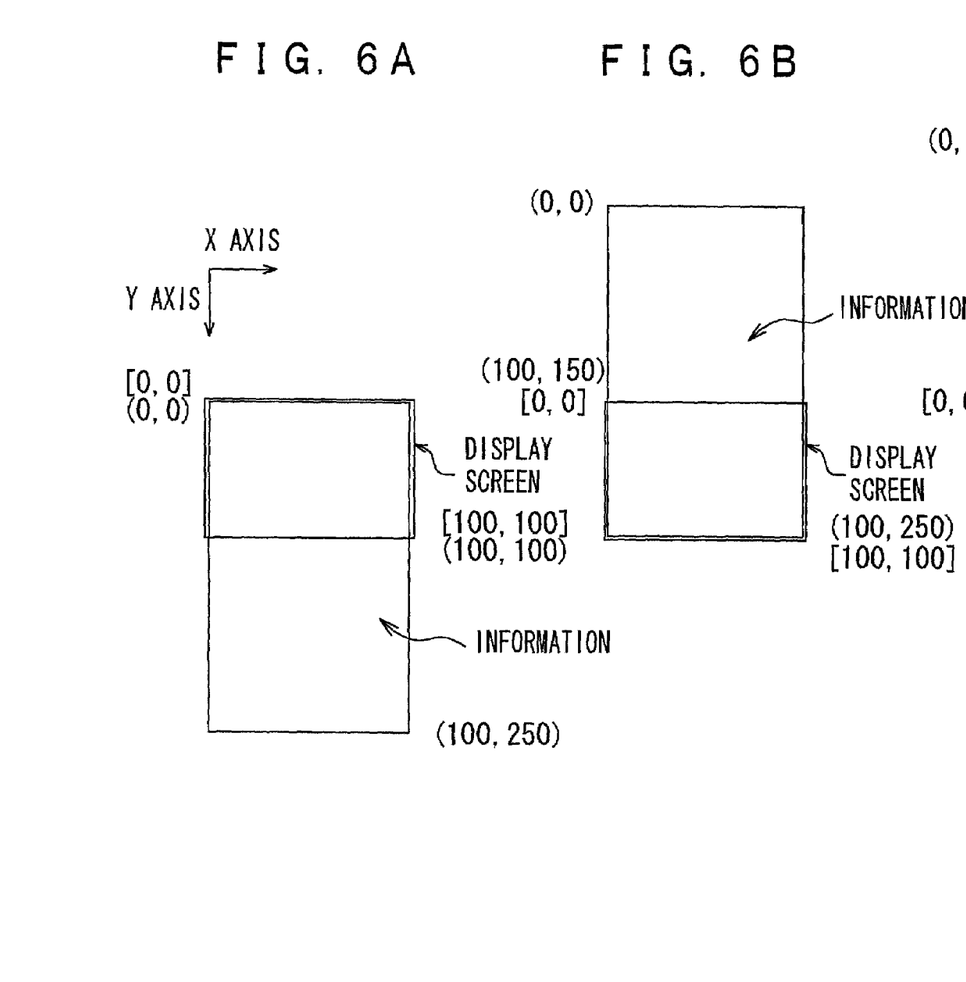
FIGS. 6A to 6C are explanatory views for a display operation when an information display size is large.

As shown in FIG. 6A, if the horizontal axis is X axis and the vertical axis is Y axis, the upper left corner of the display screen of the display section 16 has coordinates [0, 0] and the lower right corner there of has coordinates [100, 100]. On this screen, the first 100 pixels×100 pixels of the information is displayed. Then, since the coordinate value of the Y axis (to be referred to as "Y axis value" hereinafter") in the lower left corner of the displayed information is (100), the Y axis value, for example, of the information displayed at the position [0, 0] on the screen is switched to the next Y axis value (101). If so, the image is moved in the unit of display screen, thereby making it possible to display information as if one page is switched to another. In addition, if the Y axis value, for example, of the information displayed at the position [0, 0] on the screen is incremented, the information displayed on the screen is scrolled up, whereby even the information which is not displayed first can be sequentially displayed on the screen with the passage of time.

Figure 6C:
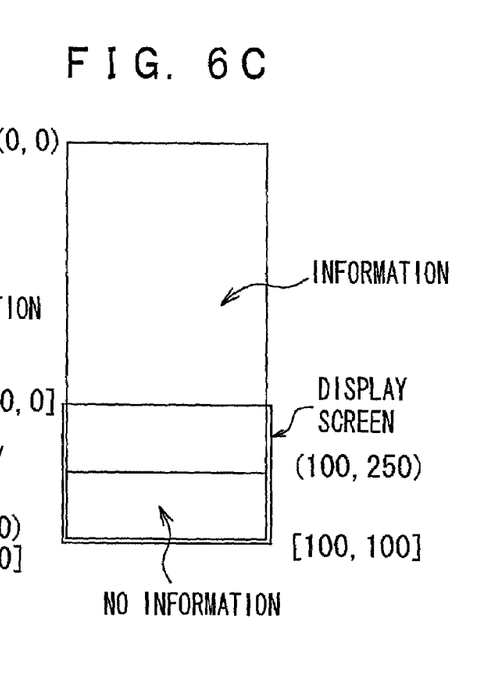
Figure 7:
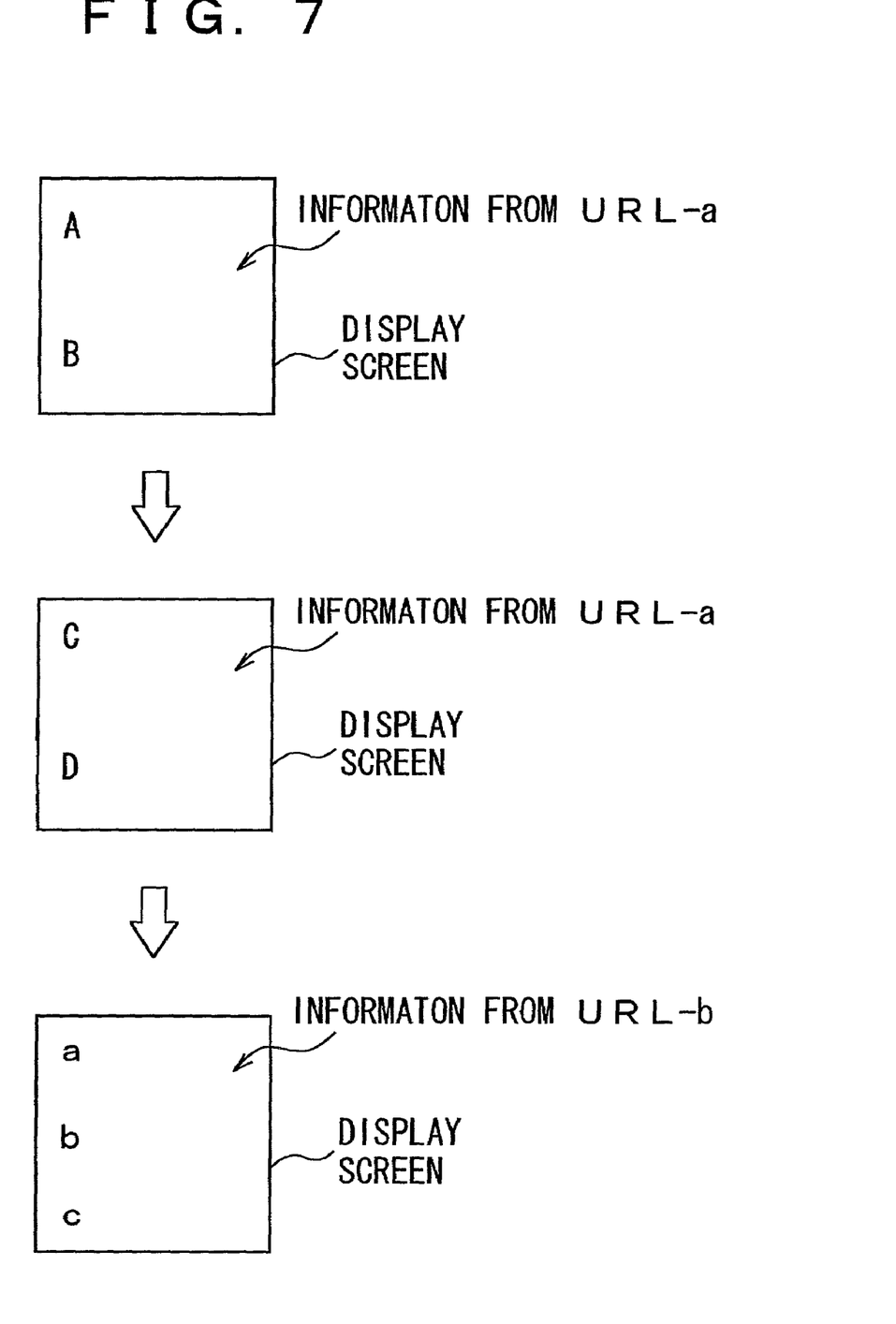
FIG. 7 is an explanatory view for an information display operation including the switching of information providing locations.

Thereafter, when a Y axis value (250) on the lowermost end of the information to be displayed is located at the Y axis value [100] on the display screen or lower than the Y axis value [100] on the display screen, the Y axis value (250) on the lowermost end of the displayed information is set at the position of the Y axis value [100] of the display screen as shown in FIG. 6B and then information is displayed. Through the processing thus carried out, it is possible to prevent a no-information part from being displayed on the screen as shown in FIG. 6C. In this manner, when information is displayed up to the end thereof, information supplied from the next information providing location is displayed. For example, as shown in FIG. 7, when the information from the information providing location "URL-a" is displayed up to the end thereof, the information from this information providing location "URL-a" is replaced by information from the next information providing location "URL-b" and the latter information is displayed.

Further, the switching of display on the display section 16 is carried out as follows. Information for one plane is displayed, and after a predetermined time or display time according to the quantity of information with the number of fonts, the number or magnitude of images set as a parameter, e.g., if the number of fonts is large, longer time is required to read a display content, so that the display time for one plane is set longer, automatic page switching is carried out. Thereafter, when the information display up to the lowermost end thereof is completed, the display of the information may be switched to information supplied from the next associated information providing location.

In this manner, the display section 16 displays information and a period for which the display of this information is held is used to carry out an advance read processing for generating and updating hierarchical link information and an automatic reading instruction list so as to discriminate an information providing location from which information is to be displayed next in advance. It is noted that in the advance read processing for updating the hierarchical link information and the automatic reading instruction list, information is read while excluding data such as images each having a large quantity of data, thereby making it possible to promptly complete discriminating the associated information providing location. Also, if information including data such as images is to be read, it is possible to promptly display information at a time information to be displayed is switched to that from the next information providing location.

Figure 8:
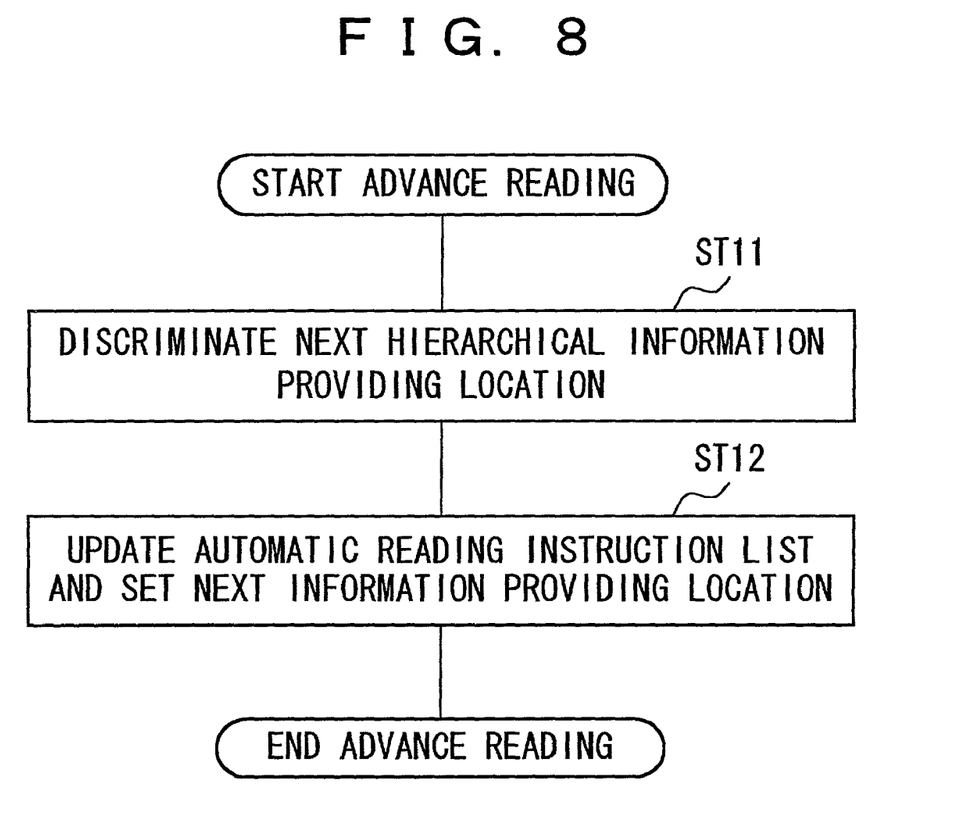
FIG. 8 is a flow chart showing an advance read operation.

FIG. 8 is a flow chart showing an advance read processing operation. In a step ST11, the content of information read from the first information providing location is discriminated and an associated information providing location is detected. Then, the detected information providing location is stored, as hierarchical link information, in the information storage section 14 and the operation goes to a step ST12.

In the step ST12, the automatic reading instruction list showing the information reading order is sequentially updated using the stored information providing locations. In addition, in this step, it is discriminated at which position of the automatic reading instruction list, the information providing location providing information displayed on the display section 16 is located to thereby discriminate an information providing location from which information is to be read next, ending the advance read processing.

In a step ST4 shown in FIG. 5, it is discriminated whether or not an end operation has been carried out. If the operation for ending reading information has not been carried out, the operation goes to a step ST5.

In the step ST5, it is discriminated whether or not an interruption operation has been carried out. If the operation section 17 has been operated to carry out the interruption processing, the operation goes to a step ST6. If the interruption operation has not been carried out, the operation goes to a step ST7.

In the step ST6, it is discriminated whether or not a restart operation for restarting the interrupted reading operation has been carried out. If it is not discriminated that the restart operation has been carried out, the operation returns to the step ST6. If it is discriminated that the restart operation has been carried out, the operation goes to the step ST7.

In the step ST7, it is discriminated whether or not the next information providing location has been set based on the automatic reading instruction list. If the next information providing location has been set, the operation goes to a step ST8.

In the step ST8, it is discriminated whether or not information to be read from the next information providing location which has been set is already stored in the data cache section 13. If the information including image and/or voice data has been read by the advance read processing and it is discriminated that the information thus read is stored in the data cache section 13, then the operation goes to a step ST9. If it is discriminated that desired information is not stored in the data cache section 13, the operation returns to the step ST1 and the next information providing location is requested to provide information.

The operation moves from the step ST8 to the step ST9. In the step ST9, since information from the next information providing location has been already obtained, another new information providing location following the information providing location the information from which location is stored in the data cache section 13 is set as the next information providing location based on the automatic reading instruction list. The operation returns to the step ST2, in which information display is started using the information stored in the data cache section 13.

For example, when the reading of the information supplied from the information providing location "URL-f" shown in FIG. 3B is completed, the operation goes from the step ST8 to the step ST1 if information read from the next information providing location "URL-g" is not stored in the data cache section 13. Then, the information providing location "URL-g" is requested to provide information. If the information read from the information providing location "URL-g" is already stored in the data cache section 13, the operation goes from the step ST8 to the step ST9. In the step ST9, an information providing location following the information providing location "URL-g" is set as "URL-h" and the operation returns to the step ST2. In the step ST2, information from the information providing location "URL-g" is displayed on the display section 16.

Further, if the end operation is carried out in the step ST4, or if the display of information on all the associated information providing locations is completed and it is discriminated in the step ST7 that the next information providing location is not set, then the information display operation is ended.

As can be seen, by designating the first information providing location, the associated information providing locations are automatically detected and the order of the information providing locations thus detected is automatically decided in accordance with the search mode, whereby information is automatically displayed according to the search mode. Due to this, even if an update operation for the information to be displayed is not carried out by operating the remote control apparatus or the like, information provided through the network is automatically, sequentially displayed. It is, therefore, possible to easily read various types of information in the same manner as that of a television apparatus.

In the above-stated automatic information reading operation, it is assumed that information is displayed for a predetermined time in the search mode set. Alternatively, the search mode may be switched or the display time interval may be changed so that the content of information can be checked even when the quantity of information to be displayed is large.

Figure 9:
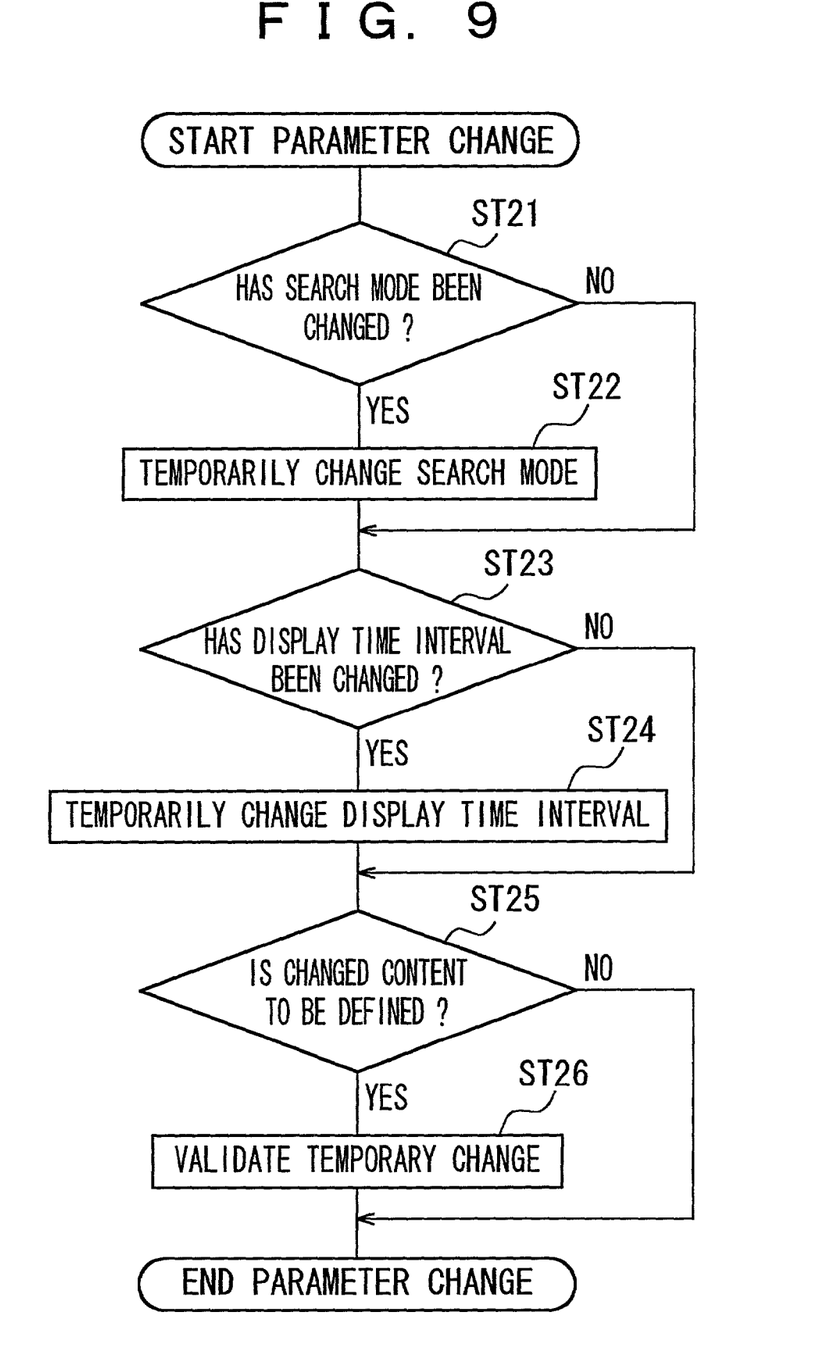
FIG. 9 is a flow chart showing a parameter change operation.

FIG. 9 is a flow chart showing a parameter change operation in the automatic information reading operation. In a step ST21, it is discriminated whether or not the search mode has been changed. If the "width priority search mode" has been changed to the "depth priority search mode" or the "depth priority search mode" has been changed to the "width priority search mode", the operation goes to a step ST22. In the step ST22, the search mode is temporarily changed and the operation goes to a step ST23. If the search mode has not been changed, the operation goes from the step ST21 to the step ST23.

In the step ST23, it is discriminated whether or not the display time interval has been changed. For example, if the display time interval is fixed and the display time interval is changed to be longer so that time for checking the content of information may be longer, the operation goes to a step ST24. In the step ST24, the display time interval is temporarily changed and the operation goes to a step ST25. If the display time interval has not been changed, the operation goes from the step ST24 to the step ST25.

In the step ST25, it is discriminated whether or not the search mode change or the display time interval change is to be defined. If the change is not to be defined, the temporarily changed search mode or display time interval is returned to the original before change and the processing is ended. If the change is to be defined, the operation goes to a step ST26. In the step ST26, the search mode or display time interval is reset to that according to the temporarily changed content, and the processing is ended. Even if the search mode is changed on the way, it is possible to generate an automatic reading instruction list according to the changed search mode based on the hierarchical link information. This is because the hierarchical link information stored in the information storage section 14 includes the link data so that not only the information providing locations but also a hierarchical structure can be discriminated.

As can be understood from the above, according to the above-stated embodiment, information from the associated information providing locations can be automatically, sequentially displayed. Therefore, even if a user does not know how to operate a computer apparatus or the like, the user can easily read various types of information. In addition, it is possible to automatically receive various information as in the case of the television apparatus without carrying out an operation for sequentially requesting various type of information.

In the above-stated embodiment, information request is issued to the information providing locations through the online processing, i.e., the communication processing section 11. Information available through an offline processing, i.e., associated information stored in a storage unit such as a hard disk device connected to the information reading apparatus can be automatically displayed in the same manner as that described above.

What is claimed is:

1. An information reading apparatus comprising: information reading means for reading information from an information providing location;
   information generation means for discriminating an associated information providing location included in the information read from said information providing location, and for generating and updating an automatic reading instruction list for designating a next information providing location from which information is read next;
   storage means for storing the automatic reading instruction list generated and updated by said information generation means;
   display means for displaying the information read by said information reading means; and
   control means for instructing one or more information providing locations to provide the information in advance, during a linked session, when the information generation means requests information from the one or more information providing locations,
   wherein when the information provided in advance does not indicate a next information providing location, information providing locations from which information has not been read are discriminated with reference to the information in a previous information providing location address, as a function of a hierarchy.

2. The information reading apparatus according to claim 1, wherein said information generation means prioritizes the information providing locations in a same hierarchy or sequentially searching the information providing locations in a deeper direction of the hierarchy, thereby generating and updating the automatic reading instruction list.

3. The information reading apparatus according to claim 1, wherein said control means discriminates a quantity of the information read by said information reading means, and sets display time for displaying said information on said display means based on a discrimination result.

4. The information reading apparatus according to claim 1, wherein if discriminating that a display size of said information is larger than a screen size of said display means, said control means switches a display part of said information to be displayed on said display means, displays all of said information by said display means and then displays information from the next information providing location on said display means.

5. The information reading apparatus according to claim 1, wherein said control means controls said information reading means based on said automatic reading instruction list using a display period for displaying said information on said display means.

6. An information reading method comprising the steps of:
   reading information from a designated information providing location;
   discriminating an associated information providing location included in the read information, and generating an automatic reading instruction list for designating a next information providing location from which information is to be read next;
   sequentially reading information from one or more information providing locations in advance, during a linked session, in accordance with said automatic reading instruction list, discriminating associated information providing locations included in the read information, and updating said automatic reading instruction list; and
   sequentially displaying the information read from said designated information providing location and the information sequentially read from the information providing locations in accordance with said automatic reading instruction list
   wherein when the information provided in advance does not indicate a next information providing location, information providing locations from which information has not been read are discriminated with reference to the information in a previous information providing location address, as a function of a hierarchy.

7. The information reading method according to claim 6, wherein
   said automatic reading instruction list is generated and updated by prioritizing the information providing locations in a same hierarchy or by sequentially searching the information providing locations in a deeper direction of the hierarchy.

8. The information reading method according to claim 6, wherein display time for displaying the information read from said designated information providing location and the information sequentially read from the information providing locations in accordance with said automatic reading instruction list is set based on a quantity of information.

9. The information reading method according to claim 6, wherein if it is discriminated that a display size of said information is larger than a screen size of display means for displaying said information, then a display part of said information to be displayed on said screen is switched, all of said information is displayed and information from a next information providing location is displayed.

10. The information reading method according to claim 6, wherein information is read during a display period for displaying said information.

11. An information reading apparatus comprising: an information reading facility adapted to read information from an information providing location;
   an information generation facility adapted to discriminate an associated information providing location included in the information read from said information providing location, and for generating and updating an automatic reading instruction list for designating a next information providing location from which information is read next;
   a storage facility adapted to store the automatic reading instruction list generated and updated by said information generation facility;
   a display adapted to display the information read by said information reading facility; and
   a controller adapted to instruct one or more information providing locations to provide the information in advance, during a linked session, when the information generation facility requests information from the one or more information providing locations,
   wherein when the information provided in advance does not indicate a next information providing location, information providing locations from which information has not been read are discriminated with reference to the information in a previous information providing location address, as a function of a hierarchy.

12. The information reading apparatus according to claim 11, wherein said information generation facility prioritizes the information providing locations in a same hierarchy or sequentially searching the information providing locations in a deeper direction of the hierarchy, thereby generating and updating the automatic reading instruction list.

13. The information reading apparatus according to claim 11, wherein said controller discriminates a quantity of the information read by said information reading facility, and sets display time for displaying said information on said display based on a discrimination result.

14. The information reading apparatus according to claim 11, wherein if discriminating that a display size of said information is larger than a screen size of said display, said controller switches a display part of said information to be displayed on said display, displays all of said information by said display and then displays information from the next information providing location on said display.

15. The information reading apparatus according to claim 11, wherein said controller controls said information reading facility based on said automatic reading instruction list using a display period for displaying said information on said display.

* * * * *